United States Patent [19]

Diller

[11] Patent Number: 4,975,850
[45] Date of Patent: Dec. 4, 1990

[54] APPARATUS AND METHOD RESPONSIVE TO VEHICLE JERK FOR ACTUATING A PASSENGER RESTRAINT SYSTEM IN A PASSENGER VEHICLE

[75] Inventor: Robert W. Diller, Pasadena, Calif.

[73] Assignee: TRW Technar Inc., Irwindale, Calif.

[21] Appl. No.: 431,544

[22] Filed: Nov. 3, 1989

[51] Int. Cl.$^5$ ............................................. B60R 21/32
[52] U.S. Cl. ............................. 364/424.05; 180/274; 280/735; 307/10.1; 340/436; 340/438
[58] Field of Search ............ 364/424.05; 180/274, 180/282; 280/734, 735; 307/10.1; 340/436, 438, 669

[56] References Cited

U.S. PATENT DOCUMENTS

| | | | |
|---|---|---|---|
| 3,750,100 | 7/1973 | Ueda | 180/274 |
| 3,762,495 | 10/1973 | Usui et al. | 280/735 |
| 3,870,894 | 3/1975 | Brede et al. | 180/274 |
| 3,911,391 | 10/1975 | Held et al. | 280/735 |
| 4,638,179 | 1/1987 | Mattes et al. | 280/735 |
| 4,842,301 | 6/1989 | Feldmaier | 180/274 |

*Primary Examiner*—Gary Chin
*Attorney, Agent, or Firm*—Tarolli, Sundheim & Covell

[57] ABSTRACT

Apparatus and method are provided for actuating a passenger restraint system in a passenger vehicle. Vehicle deceleration is sensed and a vehicle condition signal is provided which varies in value with that of vehicle deceleration. The condition signal is differentiated to provide a jerk signal having a value which varies with the rate of change of the vehicle deceleration. A predetermined time period is timed only so long as the value of the condition signal exceeds that of a first threshold level. A second signal is provided so long as the value of the jerk signal exceeds that of a jerk threshold level. A trigger signal is provided for actuating the restraint system only when the second signal occurs during the predetermined time period.

9 Claims, 2 Drawing Sheets 4,975,850

APPARATUS AND METHOD RESPONSIVE TO VEHICLE JERK FOR ACTUATING A PASSENGER RESTRAINT SYSTEM IN A PASSENGER VEHICLE

BACKGROUND OF THE INVENTION

1. Technical Field

The present invention is directed to controlling actuation of a vehicle passenger restraint system and is particularly directed to evaluating whether the rate of change of the vehicle deceleration, referred to herein as jerk, is sufficient to warrant actuation of the restraint system.

2. Prior Art

Actuatable passenger restraint systems for vehicles are well known in the art. Such systems are used to sense a crash condition and, in response to such a condition, to actuate an airbag or lock a seat belt or actuate a pretensioner for a seat belt retractor.

The U. Brede et al. U.S. Pat. No. 3,870,894 discloses an actuatable passenger restraint system employing an electrical transducer for providing an electrical signal indicative of a deployment condition, such as vehicle deceleration, for use in actuating such a restraint system. The transducer employed is a piezoelectric transducer operating as an accelerometer and provides an output signal having a value indicative of vehicle deceleration. That signal is integrated and when the integrated signal reaches a predetermined value, a trigger signal is provided for actuating the restraint system.

The M. Held U.S. Pat. No. 3,911,391 is similar to that of Brede et al., but specifically provides that the integration of the output signal of the accelerometer will only commence when the output signal exceeds a minimum threshold level, thereby preventing triggering of the restraint system when the deceleration is such that it can be safely absorbed by passengers in a vehicle.

The above noted patents to Brede et al. and Held have no provision for providing a trigger signal to actuate a restraint system in response to the rate of change of vehicle deceleration, i.e. jerk, exceeding a threshold level.

The Usuie et al. U.S. Pat. No. 3,762,495 discloses an apparatus for actuating a passenger restraint system in a vehicle which relies, in part, for its operation on sensing whether the rate of change of vehicle deceleration, i.e. jerk, exceeds a threshold level. Usui does not require, however, that the vehicle deceleration exceed a minimum threshold level or that the magnitude of the jerk exceed a jerk threshold level within a fixed period of time in order to trigger the passenger restraint system.

It has been determined that all jerks of sufficient magnitude to exceed a jerk threshold level are not timely with respect to the commencement of the crash condition and should not result in actuation of a passenger restraint system. An example of this may be a telephone pole crash at a relatively low speed on the order of 15 miles per hour. During such a crash the passengers may not be severely injured because the g levels imparted to the passengers are relatively low. Specifically, as the vehicle strikes a telephone pole, a U-shaped hole may be created in the vehicle bumper between its headlights, and the shock of the collision is not immediately transferred to the passengers. At a later point in the crash, the pole may encounter the vehicle engine, causing a jerk condition of sufficient magnitude to actuate the restraint system. However, at this later point in the crash, it may not be necessary to actuate the restraint system. Consequently, depending upon the time occurrence of a jerk, it may not be advisable to actuate the restraint system.

SUMMARY OF THE INVENTION

The present invention is directed to improvements for controlling the triggering of a passenger restraint system by requiring that a jerk sufficient to actuate the restraint system must take place within a predetermined time interval after the crash condition commenced.

In accordance with the present invention, apparatus is provided for actuating a passenger restraint system in a passenger vehicle. The apparatus includes a sensor for providing a vehicle condition signal which varies with vehicle deceleration. The condition signal is differentiated to provide a jerk signal having a value which varies with the rate of change of the vehicle deceleration. A time period T1 is timed out only so long as the value of the condition signal exceeds that of a first threshold level. A second signal is provided so long as the value of the jerk signal exceeds that of a jerk threshold level. A trigger signal is provided for actuating the restraint system only when the second signal occurs during the time period T1.

In accordance with another aspect of the invention, a method is provided for actuating a passenger restraint system in a passenger vehicle. The method includes sensing vehicle deceleration and providing a condition signal which varies in magnitude with that of vehicle deceleration. The condition signal is differentiated to provide a jerk signal having a value which varies with the rate of change of the vehicle deceleration. A time period T1 is timed out only so long as the value of the condition signal exceeds that of a first threshold level. A second signal is provided so long as the value of the jerk signal exceeds that of a jerk threshold level. A trigger signal is provided for actuating the restraint system only when the second signal occurs during the time period T1.

BRIEF DESCRIPTION OF THE DRAWINGS

The foregoing and other features and advantages of the present invention will become more apparent to those skilled in the art, to which the present invention relates, from a reading of the following description of a preferred embodiment with reference to the accompanying drawings, in which.

DETAILED DESCRIPTION OF A PREFERRED EMBODIMENT

Figure 1:
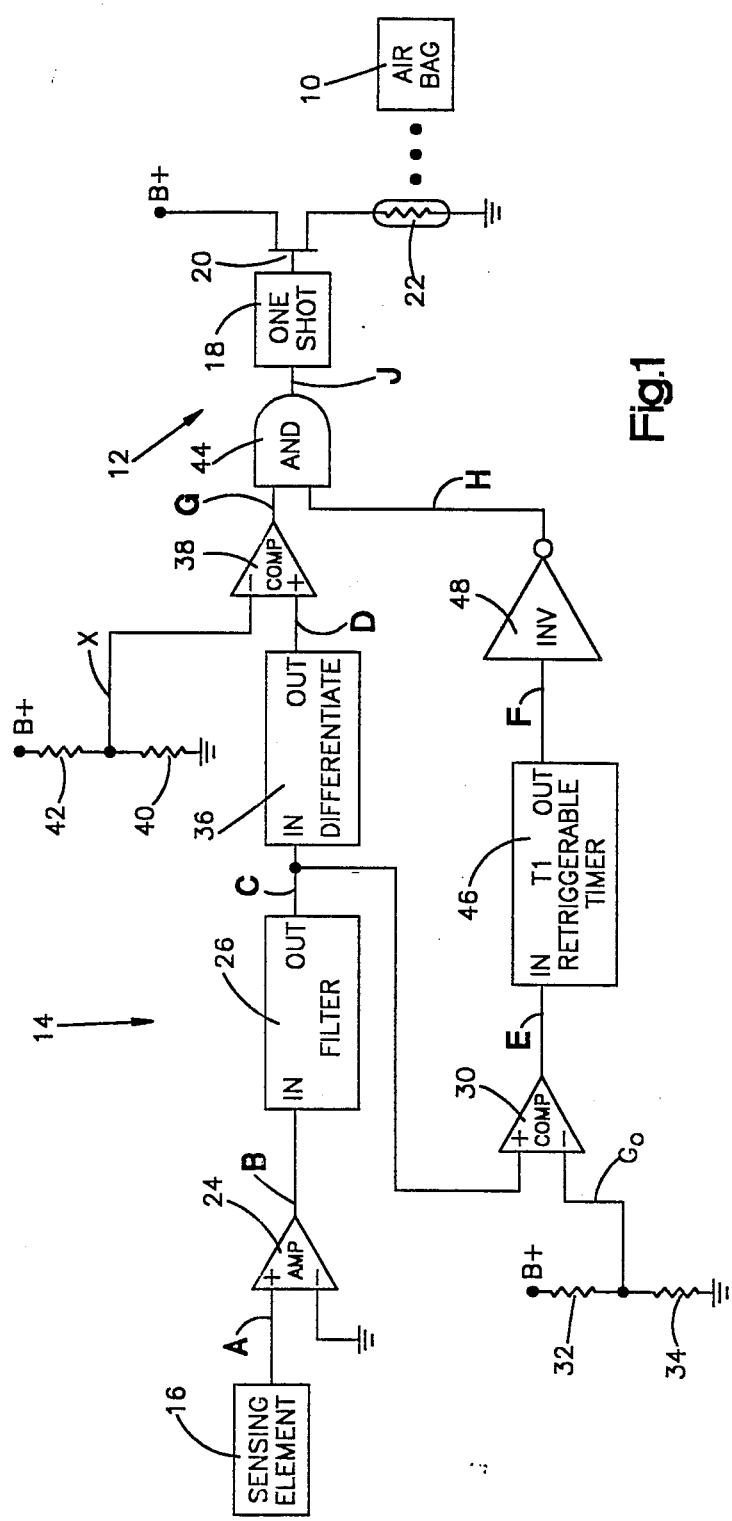
FIG. 1 is schematic-block diagram illustration in accordance with the present invention.

Reference is now made to the drawings and particularly to FIG. 1 which illustrates apparatus in accordance with the present invention for actuating a passenger restraint system in a passenger vehicle wherein the restraint system includes an airbag 10 actuated by a firing circuit 12 once an evaluation circuit 14 has determined that a valid crash is occurring. The evaluation circuit 14 is connected to the output of a sensing element 16 which provides a vehicle condition signal indicative of a potential deployment condition for actuating the airbag 10. The condition signal provided by the sensing element 16 is a voltage signal having a value which varies with that of the deceleration of the vehicle. The evaluation circuit 14 makes an analysis of the condition signal. When circuit 14 decides that a valid crash is occurring, it applies a trigger signal to the firing circuit 12.

The firing circuit 12 includes a one-shot circuit 18 which, upon receiving a trigger signal from the evaluation circuit 14, provides a firing signal. The firing signal is maintained for a fixed duration of time sufficient to turn on a transistor switch taking the form of a field effect transistor 20 having its drain to source circuit connected in series with a B+ voltage supply source and a squib 22 associated with the airbag 10. Once gated into conduction, the switching transistor 20 provides sufficient current for a sufficient period of time to ignite the squib 22 and deploy or inflate the airbag 10 in a known manner.

The sensing element 16 preferably takes the form of an accelerometer of the piezoresistive transducer type and is available from I.C. Sensors, 1701 McCarthy Boulevard, Milpitas, Calif. 95035 under Model No. 3021.

Figure 2:
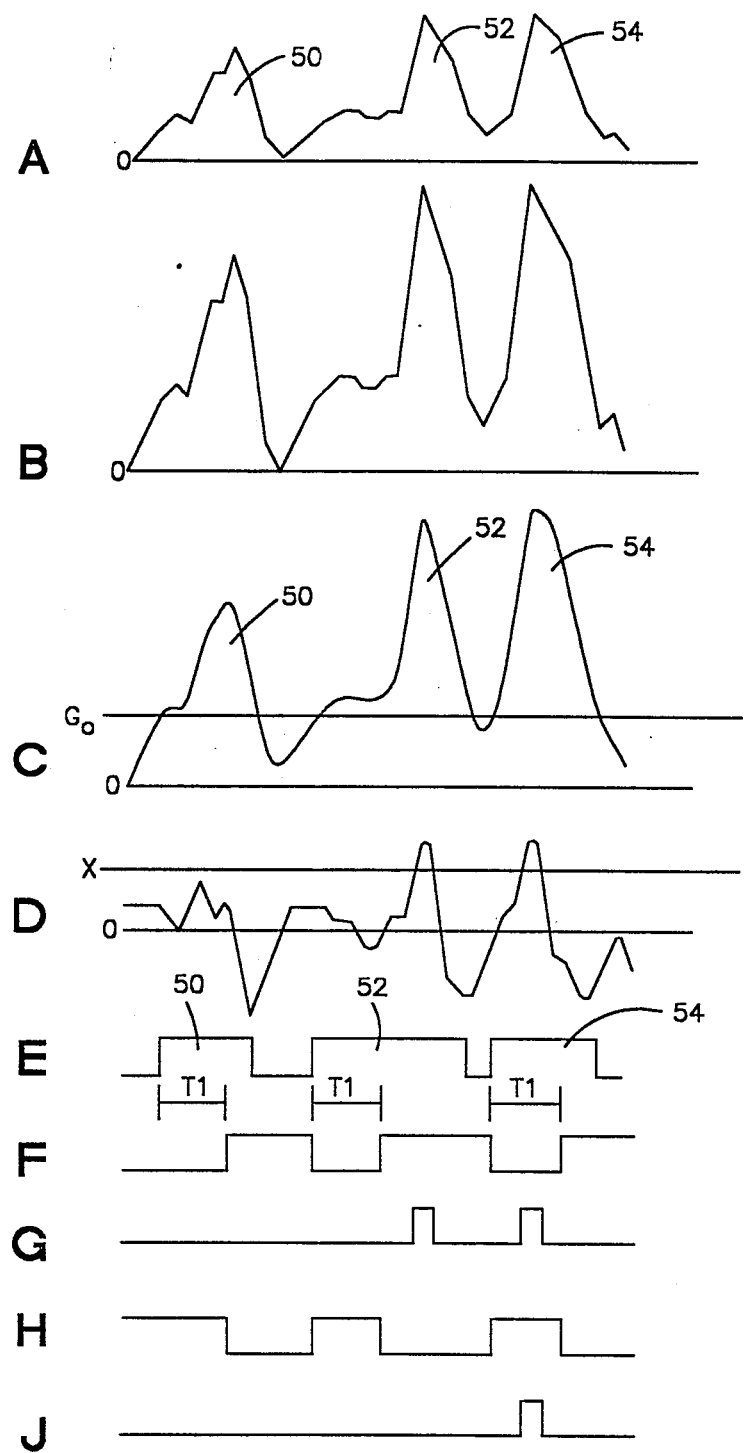
FIG. 2 presents waveforms A through J representative of certain voltage values which are present at various points of the circuit illustrated in FIG. 1 and which are useful in describing the operation of the invention herein.

During vehicle deceleration, the sensing element 16 provides an output signal having a value which varies with deceleration of the vehicle. An illustration of this output signal is represented in FIG. 2 by waveform A of voltage with respect to time. Waveforms B through J of FIG. 2, like waveform A, all represent voltage levels with respect to time at various points in the circuitry of FIG. 1 with the points having a corresponding label, i.e., points A through J. These waveforms will be of assistance in understanding the operation of the evaluation circuit 14 to be described below.

The condition signal, in this case a deceleration signal, obtained from sensing element 16 is amplified by an amplifier 24 with the amplified signal then being filtered by a low pass filter 26. The filtering removes various high frequency spikes and noise which may be present on the amplified signal and which are not representative of a jerk condition.

For a deceleration signal to be representative of a potentially valid crash condition, it should exceed some minimum threshold level, $G_o$, representative of a deceleration on the order of, for example, 5g. Decelerations of lesser amplitude are considered herein as not being of sufficient magnitude to warrant consideration by the evaluation circuit 14 to determine if a valid crash condition exists. Consequently, the filtered deceleration signal is compared with a minimum threshold level $G_o$ by means of a comparator 30. The threshold level $G_o$ may be obtained from the junction of a voltage divider including resistors 32 and 34 connected between the ground and a B+ voltage supply source. As seen by reference to the waveforms C and E, the comparator 30 will provide a positive output signal only so long as the magnitude of the filtered deceleration signal exceeds that of the minimum threshold level $G_o$. Thus, a low amplitude deceleration signal having a magnitude less than the threshold level $G_o$ is not sufficient to be recognized by the comparator 22 and, hence, the output of the comparator remains low.

The filtered deceleration signal provided by the filter 26 is also supplied to a differentiator 36 which provides at its output circuit a differentiated signal which varies in magnitude with that of the rate of deceleration, or jerk. The differentiated signal, or jerk signal, is depicted in waveform D of FIG. 2. For the jerk signal to be sufficient to actuate the restraint system 12, it must exceed a jerk threshold level X within a predetermined period of time T1, providing that the filtered deceleration signal continuously exceeds the threshold level $G_o$.

The comparison with threshold level X is accomplished with a comparator 38 that compares the jerk signal with a jerk threshold level X and provides a positive output signal so long as the jerk signal exceeds this threshold. The jerk threshold level X may be obtained from a voltage divider including a pair of resistors 40 and 42 connected in series between a B+ voltage supply source and ground. So long as the jerk signal obtained from the differentiator 36 exceeds the jerk threshold level X, the comparator 38 will provide a positive signal at its output. The positive signal from the comparator 38 is supplied as one input to an AND gate 44 which must be enabled before a trigger signal can be supplied to actuate the firing circuit 12.

The enabling signal for the AND gate 44 takes place only during the time period T1. When the output of the comparator 30 becomes positive, it actuates a timer 46 which then times the time period T1 so long as the output of the comparator 30 remains positive. The timer 46 is reset once the output of comparator 30 goes low. Consequently, the output of the timer 46 is low during the time period T1. The timer output signal is inverted by an inverter 48 to provide a positive signal during the interval that the timer 46 is timing the time period T1. The inverted positive signal is supplied to the AND gate 44 so as to enable the AND gate during the time period T1. If, during that time period, the output of the comparator 38 goes high, the AND gate 44 will apply a trigger signal to actuate the firing circuit 12.

At this point, it should be recognized that the timer 46 is of the type employing a retriggerable input, labeled IN. This means that the timer can be reset and started by the absence and presence, respectively, of a positive signal applied to its input IN. Thus, the timer is operative in response to a positive signal supplied to its input IN for timing the time period T1, but may be reset on the negative edge or termination of this positive signal. In such a case, the timer will not time out and will not provide a positive signal at its output terminal OUT.

Reference is now made to FIG. 2 which illustrates three vehicle deceleration conditions at waveform portions 50, 52, and 54 to be evaluated by the evaluation circuit 14 to determine the existence of a valid crash condition necessitating the triggering of firing circuit 12 to deploy the restraint system.

The first condition, represented by waveform portion 50, represents a vehicle deceleration of sufficient magnitude that it exceeds the threshold level $G_o$. In response to this deceleration, the output of the comparator 30 goes positive, causing the timer 46 to commence timing the time period T1. However, during the time period T1, the jerk signal, as indicated by the waveform D, does not exceed the jerk threshold level X. Consequently, during the period that the AND gate 44 is enabled, the output of the comparator 38 remains low and no trigger signal is supplied to the firing circuit 12. Thus, the evaluation circuit 14 determined that the condition represented by waveform 50 is not sufficient to trigger the restraint system.

The second condition being evaluated is represented by waveform portion 52 in FIG. 2. As seen from waveform C, this condition indicates that the vehicle deceleration is sufficiently large that it exceeds the minimum threshold level $G_o$, causing the output of comparator 30 to go positive and actuate the timer 46. During the time period T1, the jerk signal remains below the jerk threshold level X and the enabled AND gate 44 does not supply a trigger signal to actuate the firing circuit 12. This condition also shows that the jerk signal exceeds the jerk threshold level X after the timer 46 has timed out and the AND gate 44 is no longer enabled. Thus, the evaluation circuit 14 has determined that while the jerk signal attained a sufficient magnitude to deploy the restraint system, the required magnitude of the jerk signal came too late. The time period T1 may be on the order of 20 milliseconds, and the time period for a crash condition may be on the order of 100 milliseconds. A late determination of an otherwise valid jerk is indicative, for example, of a vehicle crashing into a telephone pole at a low speed, on the order of 15 miles per hour. Such a condition may not be a sufficient threat to the passengers to warrant deployment of the restraint system.

The third condition presented in FIG. 2 for evaluation is represented by waveform portion 54. From an examination of the waveforms in FIG. 2, it is seen that this condition presents a vehicle deceleration of sufficient magnitude to exceed the minimum threshold level $G_o$, causing the timer 46 to commence timing the time period T1. During time period T1, the timer 46, by way of inverter 48, enables the AND gate 44 as seen in waveform H. In the condition under examination, the magnitude of the jerk signal exceeds the jerk threshold level X before the timer times out. Consequently, a positive signal is applied by the comparator 38 to the enabled AND gate 44 which then applies a trigger signal to the firing circuit 12 for deploying the restraint system.

Whereas the invention has been described in conjunction with a preferred embodiment, it is to be appreciated that various modifications may be made without departing from the spirit and scope of the invention as defined by the appended claims.

Having described a preferred embodiment of the invention, I claim:

1. Apparatus for actuating a passenger restraint system in a passenger vehicle, comprising:
    sensor means for providing a vehicle condition signal which varies with vehicle deceleration;
    means for differentiating said condition signal to provide a jerk signal having a value which varies with the rate of change of said vehicle deceleration;
    means for timing a time period T1 only so long as the value of said condition signal exceeds that of a first threshold level;
    means for providing a second signal so long as the value of said jerk signal exceeds that of a jerk threshold level; and
    means for providing a trigger signal for actuating said restraint system only when said second signal occurs during said time period T1.

2. Apparatus as set forth in claim 1, including low pass filtering means for filtering said vehicle condition signal prior to differentiating said condition signal.

3. Apparatus as set forth in claim 1 wherein said means for timing includes means for providing a first signal so long as the value of said condition signal exceeds said first threshold level, and resetable timer means operative in response to said first signal for timing said time period T1 and operative to be reset during said time period T1 upon termination of said first signal.

4. Apparatus as set forth in claim 3, wherein said means for providing said first signal includes a comparator for providing said first signal so long as the value of said condition signal exceeds that of said first threshold level.

5. Apparatus as set forth in claim 3, wherein said trigger signal providing means includes an AND gate and means for enabling said AND gate to provide said trigger signal only when said second signal occurs during said time period T1.

6. Apparatus as set forth in claim 5, wherein said means for enabling said AND gate includes means coupled to said timer means and responsive thereto for enabling said AND gate only during said time period T1.

7. A method for actuating a passenger restraint system in a passenger vehicle comprising the steps of:
    sensing vehicle deceleration and providing a condition signal which varies in magnitude with said vehicle deceleration;
    differentiating said condition signal and providing a jerk signal having a value which varies with the rate of change of said vehicle deceleration;
    timing a predetermined time period only so long as said condition signal exceeds that of a first threshold level; and
    actuating said restraint system only when said jerk signal exceeds that of a jerk threshold level during said predetermined time period.

8. A method as set forth in claim 7, including the step of filtering said condition signal before differentiating said condition signal.

9. A method for producing a trigger signal for actuating a passenger restraint system in a passenger vehicle during a vehicle crash condition comprising the steps of:
    sensing the magnitude of vehicle deceleration resulting from a crash condition and providing a vehicle condition signal having a value which varies with said vehicle deceleration;
    differentiating said condition signal to provide a jerk signal having a value that varies with the rate of change of said vehicle deceleration;
    timing a predetermined time period only so long as the value of said condition signal exceeds that of a first threshold level;
    providing a second signal so long as the value of said jerk signal exceeds that of a jerk threshold level; and,
    providing said trigger signal for actuating said restraint system only when said second signal occurs during said predetermined time period.

* * * * *